United States Patent
Sharma et al.

(10) Patent No.: US 11,199,078 B2
(45) Date of Patent: Dec. 14, 2021

(54) TREATMENT OF OTSG BLOWDOWN

(71) Applicant: CONOCOPHILLIPS COMPANY, Houston, TX (US)

(72) Inventors: Ramesh Sharma, Houston, TX (US); Travis Dinsdale, Calgary (CA); Amber J. Taylor, Fort McMurray (CA); Babajide Kolade, Tulsa, OK (US); Jay Locklear, Bartlesville, OK (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 558 days.

(21) Appl. No.: 15/170,338

(22) Filed: Jun. 1, 2016

(65) Prior Publication Data

US 2016/0362315 A1   Dec. 15, 2016

Related U.S. Application Data

(60) Provisional application No. 62/174,903, filed on Jun. 12, 2015.

(51) Int. Cl.
| | |
|---|---|
| *C02F 1/66* | (2006.01) |
| *E21B 43/24* | (2006.01) |
| *C02F 1/00* | (2006.01) |
| *C02F 5/02* | (2006.01) |

(52) U.S. Cl.
CPC ............ *E21B 43/2406* (2013.01); *C02F 1/66* (2013.01); *C02F 5/025* (2013.01); *C02F 2001/007* (2013.01)

(58) Field of Classification Search
CPC ........................................................ C02F 1/66
See application file for complete search history.

(56) References Cited

U.S. PATENT DOCUMENTS

| | | | | |
|---|---|---|---|---|
| 2009/0308745 | A1* | 12/2009 | McLeod | B01D 61/145 204/405 |
| 2011/0127223 | A1* | 6/2011 | Astley | C01B 25/22 210/712 |
| 2013/0292115 | A1 | 11/2013 | Bansal et al. | |
| 2014/0231359 | A1* | 8/2014 | Cote | C01B 25/32 210/710 |
| 2016/0159668 | A1* | 6/2016 | Frohlich | C02F 1/52 210/713 |

* cited by examiner

*Primary Examiner* — Peter Keyworth
(74) *Attorney, Agent, or Firm* — Boulware & Vaoir

(57) ABSTRACT

A method and system generate steam for SAGD operation wherein steam generator blowdown water is acidified, cooled and clarified before reuse. Acid Clarification Treatment, or "ACT", mitigates organic fouling in Once-Through Stream Generators. Lab tests quantitatively and qualitatively show that ACT reduces Total organic carbon (TOC) and 'bad actors' TOC, respectively, in blowdown streams.

13 Claims, 4 Drawing Sheets

TREATMENT OF OTSG BLOWDOWN

CROSS-REFERENCE TO RELATED APPLICATIONS

This application is a non-provisional application which claims benefit under 35 USC § 119(e) to U.S. Provisional Application Ser. No. 62/174,903 filed Jun. 12, 2015, entitled "TREATMENT OF OTSG BLOWDOWN," which is incorporated herein in its entirety.

FIELD OF THE INVENTION

The invention relates to method and system for generating steam for downhole use with minimal fouling by cleaning feedwater before use in said steam generator.

BACKGROUND

Steam Assisted Gravity Drainage or "SAGD" is an enhanced oil recovery technology for producing heavy crude oil and bitumen. It is an advanced form of steam stimulation in which a pair of horizontal wells are drilled into the oil reservoir, one a few meters above the other. High pressure steam is continuously injected into the upper wellbore to heat the oil and reduce its viscosity, causing the heated oil to gravity drain into the lower wellbore, where it can be pumped to the surface.

As in many thermal recovery processes, the cost of steam generation is a major contributor to the cost of oil production. Historically, natural gas has been used as a fuel for Canadian oil sands projects, due to the presence of large stranded gas reserves in the oil sands area. However, with the building of natural gas pipelines to outside markets in Canada and the United States, the price of gas has become an important consideration. Other sources of generating heat are under consideration, notably gasification of the heavy fractions of the produced bitumen to produce syngas, using the nearby deposits of coal, or even building nuclear reactors to produce the heat.

In addition to the cost of steam generation, each barrel of oil produced in SAGD is coproduced with 3-5 barrels of water, which then must be separated from the oil, and treated and/or reused. Water treatment facilities further contribute to cost.

Generally speaking, high quality, high temperature and high pressure steam is required for the SAGD process. SAGD process calls for 100% quality, 7,000-11,000 kPA and 285-318° C. temperature steam. Considering oil production volume, and the fact that at least 2 barrels of water are needed for every barrel of oil, the water requirements for SAGD are immense. Indeed, as of 2008, American petroleum production (not limited to SAGD) generates over 5 billion gallons of produced water every day.

A "once-through steam generator" or "OTSG" is commonly used to provide the steam for SAGD, and other steam based enhanced recovery methods such as cyclic steam stimulation or "CSS".

The OTSG features several passes (typically 4-6) of water through the generator coil, where the feedwater is heated and eventually vaporized. Typically an OTSG comprises a convection section (also called economizer section) and a radiant section. In the convection section, the feed water is preheated by heat exchange with a hot combustion gas, usually flue gas. In the radiant section, the majority of the feedwater/wet steam will be heated by the heat radiated from the furnace, resulting in about 80% quality steam, i.e. the weight ratio of water to steam at the outlet of the generator is about 1:5. The 80% quality steam then goes through a series of liquid-steam separators (also called "flash drums") to increase the steam quality of OTSG.

The water that is separated from the steam is called "blowdown" water in the industry. It can be treated and reused in the OTSG, thus saving on overall water usage, but clean boiler feedwater is preferred, because water with dissolved organics contributes to fouling of the boiler. The recent implementation of various regulations, however, has now made water conservation mission-critical. Thus, recycle of blowdown water is an absolute necessity and methods of cleaning that water prior to recycling are needed.

"Fouling" is the contamination of the heating surface, and the build-up of contaminant will eventually decrease the heat-flux and thus the heating efficiency. Therefore the boiler has to be shut down several times a year to remove the fouling layer and/or repair the tubing. In addition to the pigging cost, the downtime increases the cost of the SAGD operation.

The organic load in the feed water is thought to be one of the contributors to OTSG fouling. Total organic carbon (TOC) is an aggregate measure of the organic load in the feed water. TOC in OTSG feed water is mainly made up of dissolved organic carbon (DOC) compounds, such as phenolic compounds, carboxylic acids, and other oxygenated hydrocarbons. Some portion of these compounds in the boiler's feed water couple/polymerize under OTSG operating temperature and pressure. The polymerized compounds drop out of solution and undergo low temperature coking reactions and foul the boiler. Field trials and lab experiments show that the recycled boiler blowdown contributes a disproportionate portion of the 'bad actors' in the feed water TOC.

Therefore, there is the need for an improved cost effective treatment of blowdown water, thereby minimizing the fouling issues and reduce the downtime and cost for SAGD operation and reducing overall water consumption.

SUMMARY

The present disclosure provides a method of eliminating or minimizing the fouling-causing contaminants the OTSG blowdown that is recycled after treatment as boiler feedwater.

The proposed invention uses acidification, cooling, and clarification to reduce the TOC, specifically 'bad actors' TOC, in the recycled boiler blowdown and hence in the boiler feed water. This Acid Clarification Treatment, or "ACT", will mitigate organic fouling in Once-Through Stream Generators. In addition, this procedure utilizes the difference between the effect of general TOC and 'bad actors' TOC on boiler fouling to optimize the level of acidification needed.

Lab tests quantitatively and qualitatively show that ACT reduces TOC and 'bad actors' TOC, respectively, in blowdown streams. For example, ultraviolet-visible light absorption in the 400 nm-800 nm range, which is the absorption range of 'bad actor' TOC, was reduced by 30%. These tests thus confirm the premise of the invention. Additional lab tests show that ACT was able to reduce average molecular weights of naphthenic acids in blowdown from 300 to 225, reduce calcium and magnesium concentrations by 75%, and reduce silicon concentration in blowdown by 30%.

Preferably, the method is used to clean blowdown for reuse in a once-through steam generator, but the cleaned water may also be used in other type of steam generator, for example a traditional steam drum boiler, heat recovery steam generator, direct steam generator, recirculating steam generator, or for any other use needed e.g., at an oil and gas well site or central processing facility.

Furthermore, although particularly beneficial for use with OTSG blowdown and SAGD steam generation, the invention is applicable to other blowdown and dirty waters, and the resulting waters can be used for other purposes, such as e.g., variants of SAGD, CSS, and other steam based oil production methods, and also for non-petroleum related uses. Furthermore, produced water may also be amendable to cleaning with the ACT method, since produced water will contain many of the same organics.

In another embodiment, the disclosure provides improved methods of producing steam for use in producing oil, the method comprising recycling blowdown water in an OTSG or other steam generator to make steam to inject into a wellbore and mobilize oil for production, the improvement comprising acid clarification treatment ("ACT") of said blowdown water before use to make steam, said ACT comprising acidifying said blowdown water to pH 7-8 or lower, cooling said acidified blowdown water to 30-40° C. or lower, and allowing acid insoluble precipitants to settle for at least 12 hours, or 24 or 48 hours or more, separating said settled precipitants from cleaned water, adjusting the pH of the cleaned water if necessary, and using said cleaned water to make steam, and finally injecting said steam into a wellbore to mobilize oil for production.

As used herein, a "Once-Through Steam Generator" or "OTSG" is a specialized type of heat recovery steam generator without boiler drums (see e.g. FIG. 1). In this design, the inlet feedwater follows a continuous path without separate segmented sections for economizers, evaporators, and superheaters. This provides a high degree of flexibility as the sections are allowed to grow or contract based on the heat load being received from the gas turbine. The absence of drums allows for quick changes in steam production and fewer variables to control, and is ideal for cycling and base load operation.

The OTSG without a superheating section typically produces a "wet" steam that consists of about 77% steam and 23% water. The water that is separated from the steam is known as "blowdown water." It typically has concentrated levels of TOC and thus is quite dirty.

As used herein, "economizer" means the devices for reducing energy consumption in a steam-generating operation by preheating feedwater. Typically an economizer is in the form of heat exchanger where the thermal energy is transferred from a high temperature fluid (e.g., steam condensate, flue gas or other waste heat source) to the feedwater such that less energy is required to vaporize it. Economizers are mechanical devices intended to reduce energy consumption or to perform another useful function such as preheating a fluid. In boilers, economizers are heat exchange devices that heat fluids, usually water, up to but not normally beyond the boiling point of that fluid. Economizers are so named because they can make use of the enthalpy in fluid streams that are hot, but not hot enough to be used in a boiler, thereby recovering more useful enthalpy and improving the boiler's efficiency. They are fitted to a boiler and save energy by using e.g., the exhaust gases from the boiler or other hot plant fluids to preheat the cold feedwater. It has been reported that approximately 35 to 50% of the total absorbed heat in OTSG is transferred in the economizer.

As used herein, "radiant section" means the section in a steam generator where the heating of feedwater is primarily achieved by radiant heat transfer.

As used herein "Acid Clarification Treatment" or "ACT" refers to acidifying a dirty water to initiate precipitation of acid insoluble components of the dirty feed water, followed by cooling and settling to remove said precipitants. The remaining water is referred to as "cleaned water" although there are still acid soluble components therein. If desired, the cleaned water can be further treated, depending on use and regulatory requirements. Alternatively, the cleaned water can be blended with another feedwater source, further diluting any organics.

As used herein, "dirty water" refers to water having a TOC of at least 300 ppm, wherein the makeup of TOC includes e.g., residual oil and grease, organic acids, phenolic species, components originated from chemical additives, as well as low molecular weight species like formate, acetate, etc. Blowdown water typically has concentrated TOC of up to 1800-3500. Dirty water also typically includes significant $SiO_2$, Ca and Mg (both dissolved and precipitated/complexed) levels, as well as other contaminants.

As used herein, "cooling" refers to a passive process of allowing the acidified blowdown water to cool to between e.g., 25-45° C. or more preferably to 30-40°. If desired, residual heat can be captured before this process, by any method used in the art such as in a preheat step using e.g., reverse flow against incoming feedwater entering the OTSG.

As used herein, "settling" is a passive process of leaving the acidified cooled blowdown water to stand so that the majority of solids fall to the bottom of the tank. Such methods typically require 12-48 hours, or more preferably ≥24 hrs, or ≥48 hrs. Such methods can also be combined with additional known methods of solids removal, such as e.g., filtration or centrifugation, but given the very large volumes required for steam injection, passive settling methods are preferred. If settling occurs in a sludge pond, then the top, clear layer of water is siphoned off for reuse at one end, whereas input is at the other end, and the actual residence time is uncertain. If the settling occurs in a dedicated settling tank, then the top, clear layer of water is siphoned off for reuse at one end, whereas the settled sludge can be removed from the bottom of the tank, which can be a cone or flat bottom shape.

The invention includes any one or more of the following embodiments, in any combination thereof:

- A method of treating once through steam generator (OTSG) blowdown water for reuse, said method comprising: providing OTSG blowdown water; acidifying said OTSG blowdown water to pH 8 or lower; and cooling said OTSG blowdown water to 30-40° C.; settling precipitants out of said OTSG blowdown water for at least 12 hours to produce an acid clarified blowdown water; and reusing said acid clarified blowdown water.
- A method of treating blowdown water for reuse as described herein, wherein the cooling step occurs at least partially before the acidifying.
- A method of treating blowdown water for reuse as described herein, wherein the settling step occurs in a sludge pond.
- A method of treating blowdown water for reuse as described herein, wherein the settling step occurs in a clarifier tank.
- A method of treating blowdown water for reuse as described herein, wherein the settling step occurs in a sludge pond.
- A method of treating blowdown water for reuse as described herein, wherein the reusing step comprises use as feedwater in a steam generator.

A method of treating blowdown water for reuse as described herein, wherein the reusing step comprises blending with clean feedwater and use as feedwater in a steam generator.

A method of treating blowdown water for reuse as described herein, wherein the reusing step comprises blending with clean feedwater and use as feedwater in an OTSG.

A method of treating blowdown water for reuse as described herein, further comprising a softening step in a warm lime softener to remove calcium, magnesium and silica.

A method of treating blowdown water for reuse as described herein, further comprising adjusting pH of the acid clarified blowdown water to pH 8 or lower.

A steam generator system for oil production, comprising: an OTSG having a feedwater line for inputting feedwater into said OTSG, said OTSG capable of generating steam and blowdown water; a separator for separating said steam and said blowdown water; an acid supply tank for acidifying said blowdown water; a clarifying tank for clarifying acidic blowdown water; a clarified blowdown water line for feeding said clarified blowdown water to said feedwater line; wherein elements a though e are fluidly connected.

A steam generator system for oil production as described herein, further comprising a softener for removing hardness from said clarified blowdown water before entering said feedwater line.

A steam generator system for oil production as described herein, further comprising a warm lime softener for removing hardness from said clarified blowdown water before entering said feedwater line.

An improved method of producing steam for oil production, the method comprising heating feedwater in an steam generator to generate steam for downhole use and blowdown water to reuse in said steam generator, the improvement comprising acidifying, cooling and clarifying said blowdown water before reuse in said steam generator.

An improved method of producing steam for oil production, the method comprising heating feedwater in an OTSG to generate steam for downhole use and blowdown water to reuse in said OTSG, the improvement comprising acidifying, cooling and clarifying said blowdown water before reuse in said OTSG.

An improved method of producing steam for oil production, the method comprising heating feedwater in an OTSG to generate steam for downhole use and blowdown water to reuse in said OTSG, the improvement comprising acidifying, cooling, clarifying and softening said blowdown water before reuse in said OTSG.

An improved method of producing steam for oil production, the method comprising heating feedwater in a steam generator to generate steam for downhole use and blowdown water to reuse in said a steam generator, the improvement comprising acidifying, cooling, clarifying and softening said blowdown water before reuse in said steam generator.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| ACT | Acid Clarification Treatment - |
| AOP | Advanced oxidation process |
| ATM | Atmosphere |
| BFW | Boiler feed-water |
| CAPEX | Capital expenditures |
| CCS | Cyclic steam stimulation |
| CPF | Central processing facility |
| DOC | Dissolved organic carbon |
| OPEX | Operating expenditures |
| OTSG | Once-through steam generator |
| SAGD | Steam-assisted gravity drainage |
| TDS | Total dissolved solids |
| TOC | Total organic carbon |
| Ts | Saturation temperature |
| TSS | Total suspended solids |
| WLS | Warm-lime softener |

DETAILED DESCRIPTION

Figure 1:
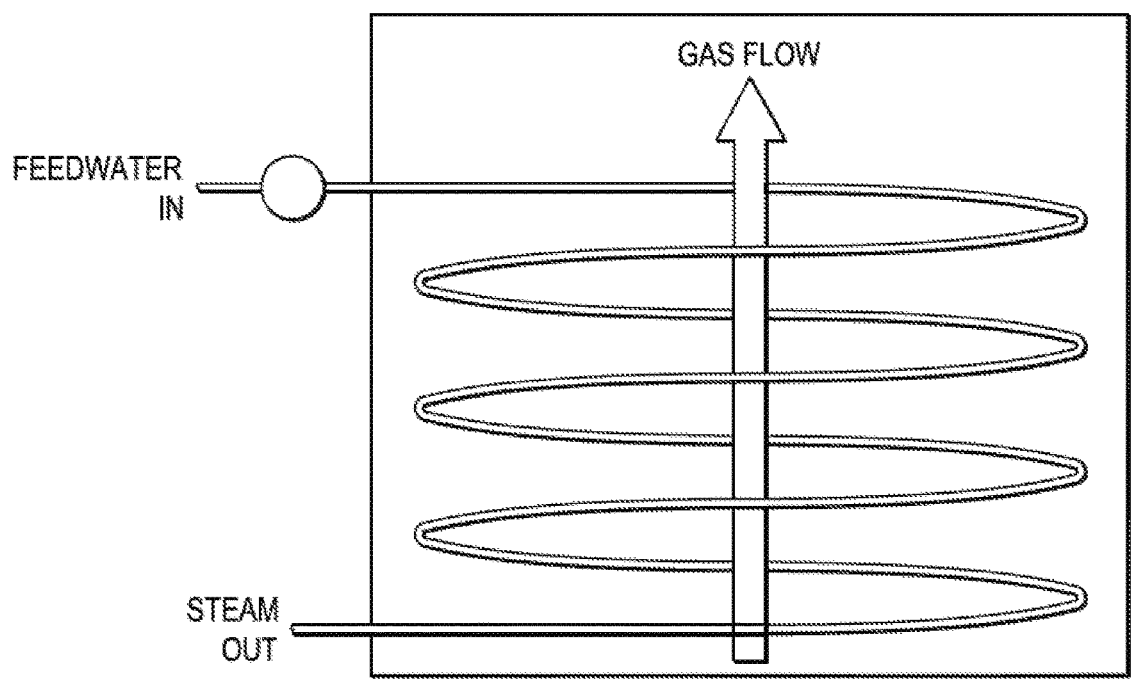
FIG. 1 illustrates the operating principle for an OTSG.

As noted in the introduction, blowdown water must be recycled in order to meet strict water regulations, but it is typically heavily contaminated water and use without pretreatment has resulted in shutdown and pigging to clean the OTSG every six weeks. This could result in downtime, equipment maintenance, and revenue loss. Thus, there is a need to pretreat the blowdown water in a cost effective manner so as to reduce the TOC level and increase the time between pigging operations.

We investigated several possible alternatives for cleaning this particular dirty water. Ion exchanges resins were investigated, but even using the best resin according to our bench testing, the method was impractical because more water was needed to regenerate the resins than could be cleaned using the resins. Thus, the method actually worsened water usage, rather than improving it. For example, the anion exchange resin TAN-1 (Dowex™) capacity was found to be limited, and 75 volumes of 10% NaCl and 4% NaOH for resin regeneration was needed for resin regeneration whereas resin capacity, whereas the resin was already exhausted only at 20 bed volumes of dirty blowdown water.

Another method investigated was an advanced oxidation process (AOP) employing ozone/peroxide. The AOP process showed effectiveness for acid insoluble organics removal. At 1000 mg/L ozone dosage, about 50% of the acid insoluble organics were removed from the system. However, AOP was rejected as cost ineffective because it required high CAPEX and OPEX to implement on the large scales needed for steam injection as a method of enhanced oil recovery.

We also investigated evaporator technology, but this method also required high CAPEX and OPEX, and the treatment of evaporator blowdown, which will be at least three times that of OSTG blowdown, adds some uncertainly to the method. It may be of limited value to generate even dirtier water while cleaning the OTSG blowdown water.

After considerable testing of several alternatives, it was determined that an acid clarification treatment was the most cost effective method of cleaning OTSG blowdown water. Acid alone treatment was ranked high because i) it is targeted to remove most sparingly soluble organics from the OTSG blowdown stream, ii) acid clarification removes more than 50% acid insoluble organics, which is about same as the 1000 mg/L ozone treatment, and iii) it is a minimal treatment approach, utilizing mostly the existing infrastructure and hence the CAPEX and OPEX are low.

The acid clarification treatment method requires that OTSG blowdown be acidified to a pH between 7 and 8, or lower, and then allowed to cool to 30 to 40° C. before settling for at least 12 hrs (to complete the precipitation and allow the suspended solids to fall to the bottom). Any strong acid can be used, and HCl and sulphuric acid have been tested to date, although sulfuric acid is preferably avoided. Weak acids could also be used, although greater quantities are required, making them less preferred.

The cooled acidified water can then can be clarified and/or filtered and recycled to the warm-lime softener (WLS). A large tank (or a clarifier) or the existing sludge pond can be used to provide adequate storage for cooling and settling of the precipitated solids.

The treated clarified blowdown water stream may be re-heated to 80° C. and the pH adjusted if necessary prior to entering the WLS to avoid dropping the temperature of the WLS and thus negatively impacting hardness removal. This can be done with original hot blowdown water in a heat exchanger, though this preheating step may not be needed.

The disclosure provides a novel method and systems for pretreating blowdown water by acid clarification treatment prior to recycling, but the method can be generally applied to any dirty water, such as produced water, OTSG blowdown, evaporator blowdown, and the like. The cleaned water may still have some dissolved organics, but any increase in time between shutdown for pigging of the OTSG is greatly beneficial. The method is very simple, and can be implemented with low CAPEX and OPEX because it can be easily performed with existing systems with only a few simple modifications. The clean water can be used as is, or can be blended with other waters, such as pond water or other relatively clean source water. The cleaned water can then be used in steam generation, e.g., as boiler feedwater for an OTSG, or for other uses.

It is believed that by using the methods and systems described herein, fouling in the steam generator can be greatly reduced, thereby reducing the operational cost and downtime for repairing and maintaining the steam generator and at the same time meeting strict water usage regulations.

In general, an improved method of generating steam for SAGD, and other heavy oil production uses is provided, wherein blowdown feedwater is acid clarified to remove about 50% of the TOC prior to use as a feedwater for a steam generator. This process is less relevant to CSS since that process typically does not recycle OTSG blowdown, but rather injects it along with the steam during steam stimulation process.

A system for generating steam is also provided, comprising a steam generator for generating steam and blowdown, an acid supply for acidifying blowdown, a tank for acidifying and settling the blowdown water, and appropriate lines connecting the various components. Of course, all of the elements are in fluidic connection, such that fluid can travel from one part of the system to another.

FIG. 1 illustrates the basic concept of an OTSG, wherein a single tube holds the feedwater, which winds back and forth and the feedwater therein is progressively heated by e.g., hot gas travelling in the reverse direction.

Method

OTSG blowdown coolers have reported organic fouling issues in the recent past, indicating that organic molecules present in the boiler feed water stream are highly unstable and start precipitating even with a reduction in temperature. A set of systematic experiments was designed to evaluate if the unstable nature of organics present in the OTSG blowdown stream might be exploited to solve the organics fouling problem boilers.

Figure 2:
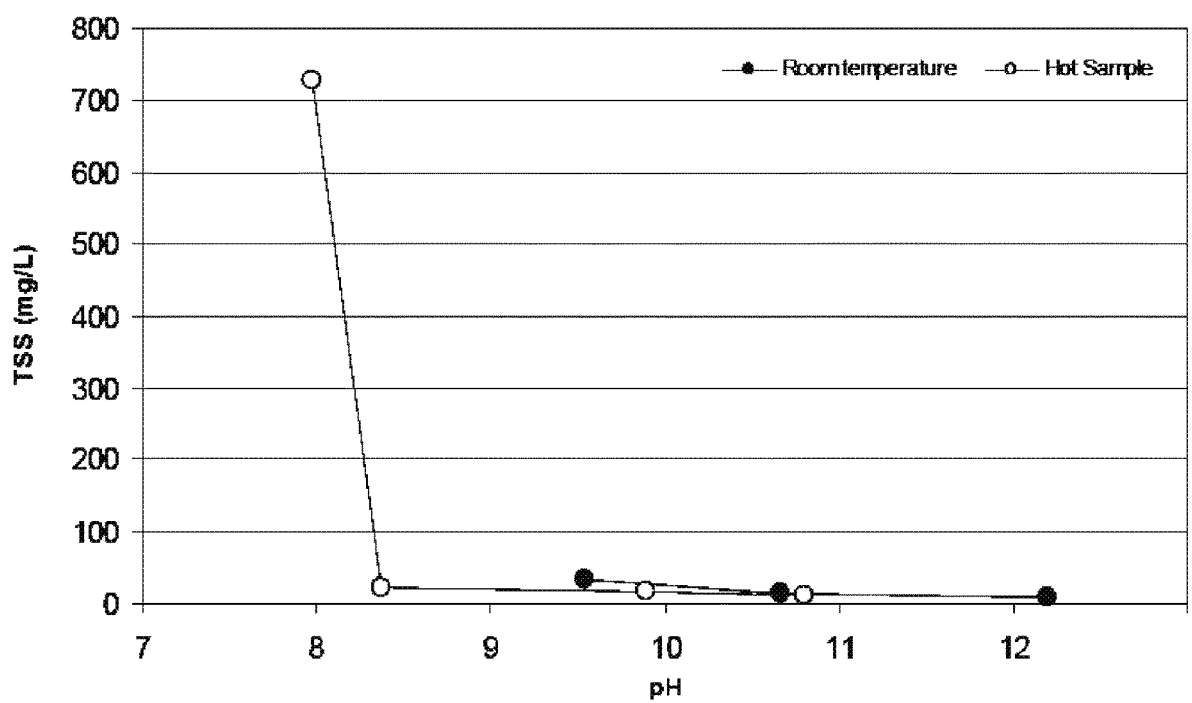
FIG. 2 Effect of acid addition on Total Suspended Solids (TSS)—a graph of TSS versus pH. A steep increase in TSS generation was noted after the pH drop to 7, which provided an indirect measure of accelerated organics precipitation at pH 7 and provided the motivation to investigate acid clarification as one possible method of cleaning blowdown water prior to reuse.

The first round of tests was conducted at the central processing facility using a fresh blowdown (BD) sample. OTSG blowdown was titrated with HCl to pH levels 10.75, 9.75, 8.5. and 7. These samples were allowed to react and cool after acid addition for about 60 minutes. A steep increase in TSS generation was noted after the pH drop to 7, which provided an indirect measure of accelerated organics precipitation at pH 7. See FIG. 2.

A second round of tests was conducted at an offsite laboratory with the capability to measure TOC accurately. First OTSG blowdown water samples were heated to 60° C. to reflect the typical temperature of blowdown water. The warmed samples were then acidified with HCl to pH values: 8.5, 8, 7.5, and 7.0 from the initial pH of 11.3. The HCl amounts to reach each of the target pH were noted as 2667, 2889, 3111, and 3333 mg/L. After 60 minutes, samples were collected from each vial for TSS and TOC measurement.

Figure 3:
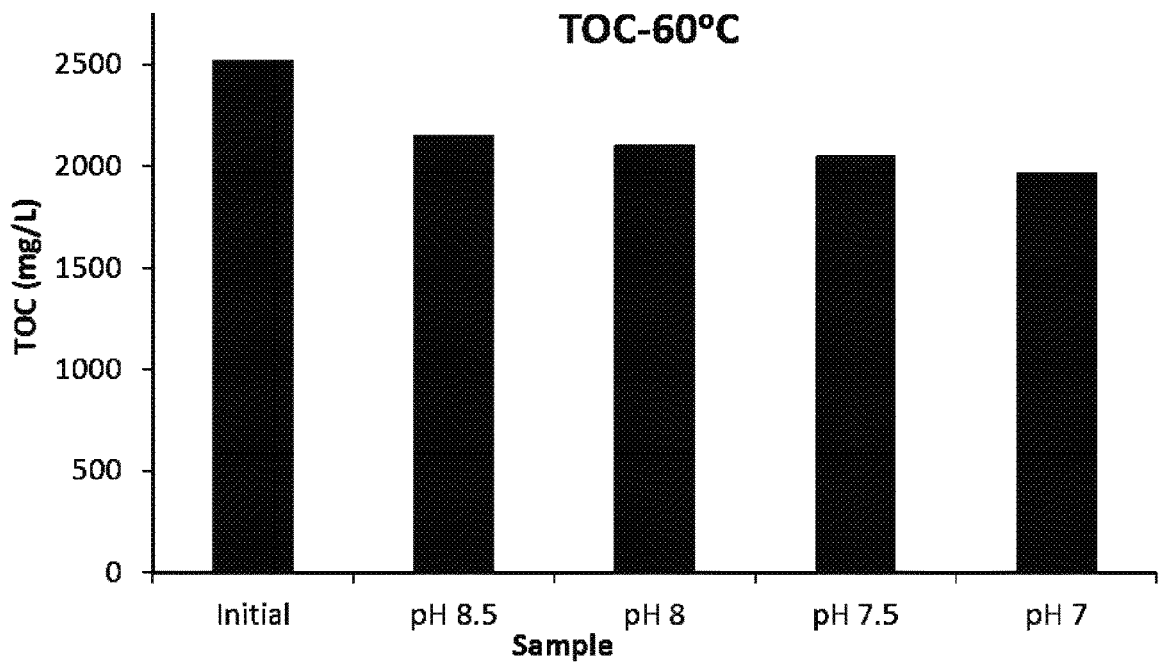
FIG. 3 Effect of acid addition on organics removal—a graph of total organic carbon (TOC) versus pH showing increasing precipitation of TOCs with increasing pH.

As shown in FIG. 3, about 20% TOC drop (~500 mg/L) was noted in TOC concentration when the OTSG blowdown was acidified to pH 7-8. This is a significant drop in TOC and would indicate that some of the more problematic organics can be taken out of the process simply by acidification. The acid insoluble organics are measured at pH<2.

The total amount of acid insolubles measured in blowdown was roughly 1000 mg/L. A 500 mg/L drop in acid insoluble at pH 7-8 suggest that about 50% of problematic organics can be precipitated by acid clarification treatment (target pH 7).

Figure 4A:
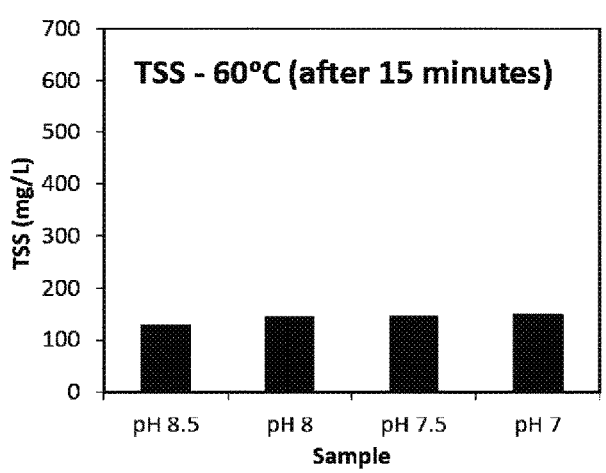
FIG. 4A and FIG. 4B Effect of acid addition and temperature on TSS generation—a graph of total suspended solids (TSS) versus pH under warm (FIG. 4A: 60° C., 15") versus cooled (FIG. 4B: 22° C., O/N) conditions. This graph confirms that TSS increases with acid treatment and cooling. These TSS can be removed by allowing the suspended solids sufficient time to settle for e.g., at least 12 hrs. The effect of changing pH on the precipitation kinetics is immediate, while mixing and separation may take some time. However, mixing and separation may be optimized by appropriate vessel design.
Figure 4B:
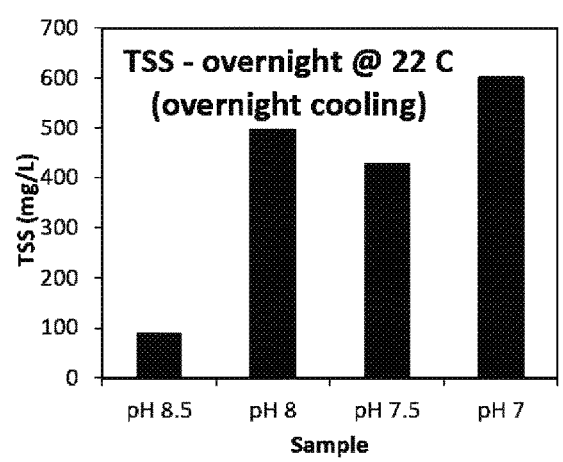

FIG. 4A provides an estimate of immediate TSS generation upon acidification after 15 minutes. FIG. 4B data were collected overnight after the cooling the sample to 22° C. A 5 fold increase in TSS generation, following the overnight cooling, indicated that organics precipitation reactions are slow, and are favored at lower temperature and pH.

System

Figure 5:
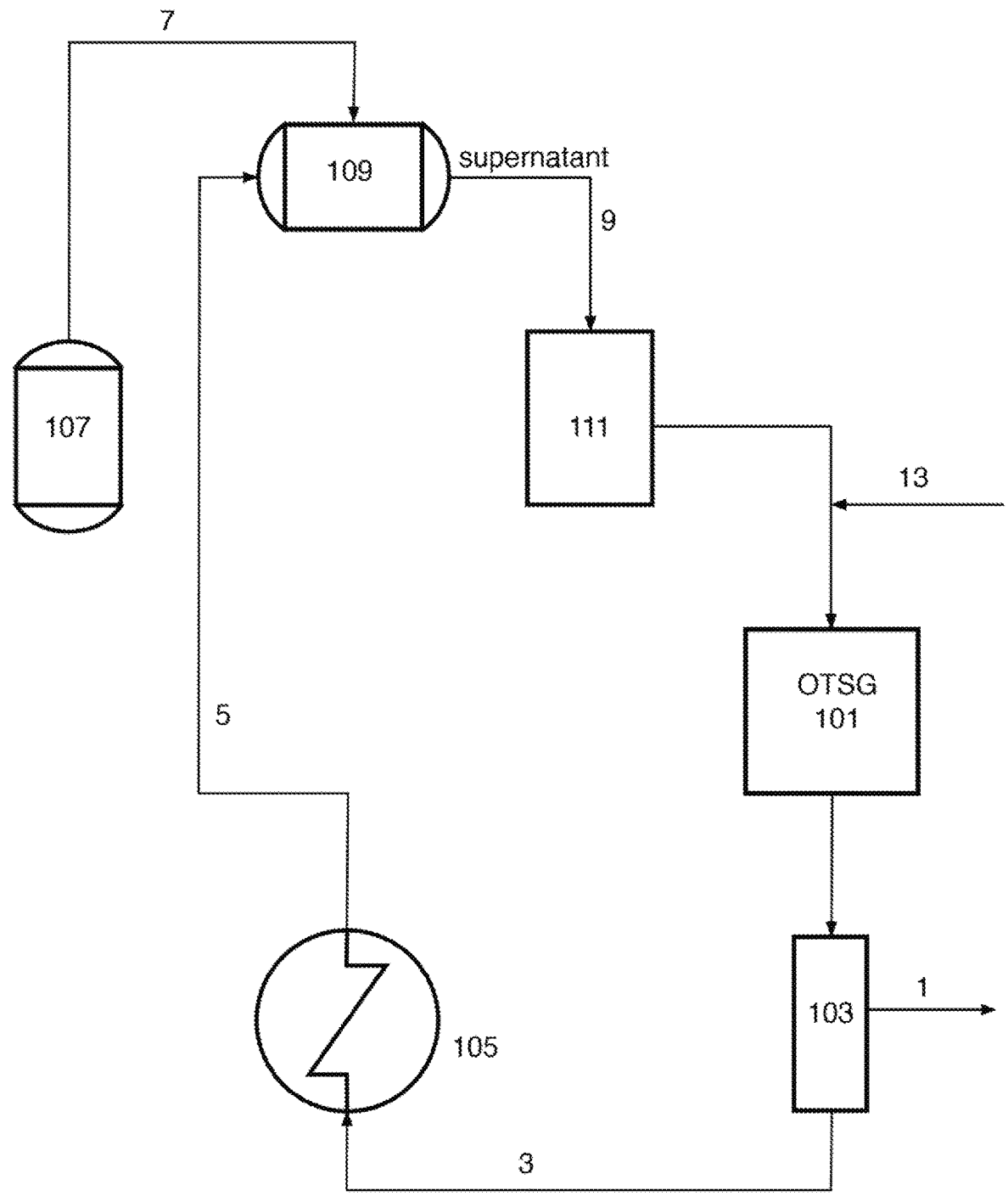
FIG. 5 One proposed embodiment of an acid clarification treatment system before reuse in an OTSG.

Based on the above observations, the system 100 in FIG. 1 illustrates one possible embodiment for implementing the inventive methods. In FIG. 5, clean feedwater enters the OTSG 101 via feedwater line 13. A 70-80% steam exits the OTSG 101 to separator 103 where steam is routed e.g., for steam injection via line 1, and dirty blowdown water exits via line 3 to heat exchanger 105, which can be used e.g., for preheat of the feedwater or preheat of the acid clarified blowdown water before entering the WLS 111, or for any other use.

In one embodiment, cooled blowdown exits heat exchanger 105 via line 5 to tank 109 where acid is added via line 7 from acid supply tank 107. If the volume of tank 109 is sufficient, the acidified blowdown water can clarify in this tank, but if not, the cooled acidified water can be routed to a sludge pond for a more lengthy clarification (not shown). The clarified supernatant travels to water lime softener 111 via line 9, and from there back to OTSG 101 via lines 11 and 15.

Figure 6:
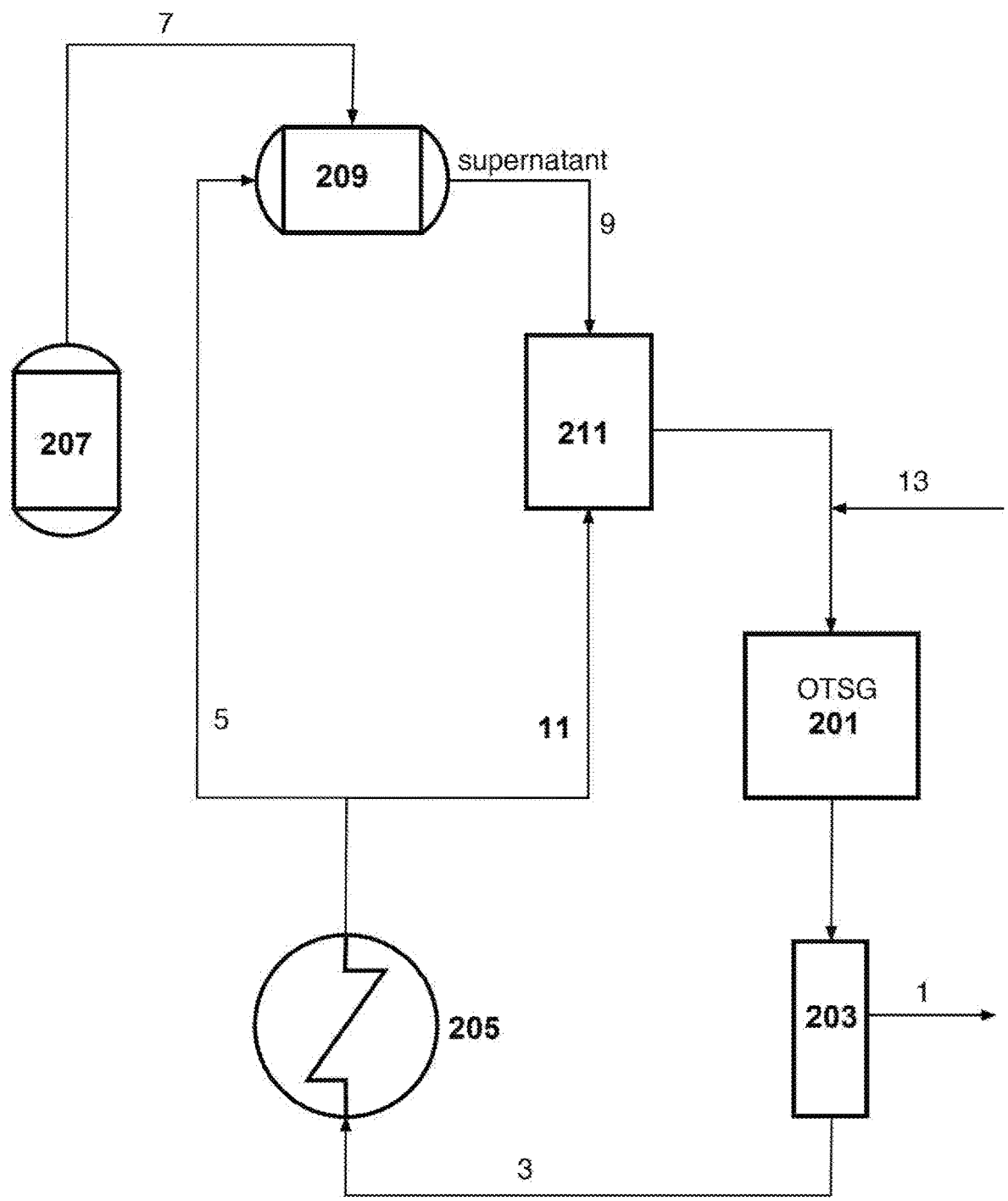
FIG. 6 One proposed embodiment of an acid clarification treatment system before reuse in an OTSG.

In FIG. 6, clean feedwater enters the OTSG 201 via feedwater line 13. A 70-80% steam exits the OTSG 201 to separator 203 where steam is routed e.g., for steam injection via line 1, and dirty blowdown water exits via line 3 to heat exchanger 205, which can be used e.g., for preheat of the feedwater or preheat of the acid clarified blowdown water before entering the WLS 111, or for any other use.

In another embodiment, cooled blowdown exits heat exchanger 105 via line 5 to tank 209 where acid is added via line 7 from acid supply tank 207 or may be transferred directly via line 11 to the WLS 211. If the volume of tank 209 is sufficient, the acidified blowdown water can clarify in this tank, but if not, the cooled acidified water can be routed to a sludge pond for a more lengthy clarification (not shown). The clarified supernatant travels to water lime softener 211 via line 9, and from there back to OTSG 201 via lines 11 and 15.

Additionally, an anthracite filter may be provided between the WLS and OSTG. Using anthracite filter media has the advantages of not requiring chemicals for maintenance, durable with long life and temperature range, lower backwash rate, ideal for sub-fill requirements and hot process filtering applications, while containing no silica. The wide temperature range is especially beneficial for the OTSG operation.

A weak acid cation exchange can also be added between the WLS and the OTSG for water softening. The weak acid cation exchange have a high affinity for the divalent cations that constitute hardness, and remove cations and associated alkalinity from water by converting alkaline salts of calcium and magnesium to the corresponding weak acid (dissolved $CO_2$). The dissolved $CO_2$ can later be removed by degasification. Weak acid cation exchange resins are typically made of co-polymers of acrylic acid with divinyl benzene or methacrylic acid as a crosslinking agent. Non-limiting examples of weak acid cation resins include Amberlite IRC-86 and IRC-50 by Rohm & Haas, Purolite C-105 by Purolite, Dowex MAC-3 by Dow Chemicals, Lewatit CNP 80 WS by Bayer, and Indion 236 by Ion Exchange (India) Ltd.

The minimal treatment approach requires that the OTSG blowdown be acidified to pH between 7-8, or lower, and then allowed to cool to 30-40° C. before settling for at least 12 hrs. However, using the OTSG in a heat exchanger to e.g., preheat the boiler feedwater or heat the WLS, can accomplish much or all of this cooling before acid is added thereto.

A large tank (like a clarifier) or an existing pond will be required to provide the adequate storage for cooling and settling of the precipitated solids. Alternatively or in addition, the cooled blowdown water supernatant can be routed through a filter, e.g. a sand filter, and routed to the warm-lime softener. From the WLS, which removes silica, the feedwater is routed to the OTSG.

The invention claimed is:

1. A method of treating once through steam generator (OTSG) blowdown water for reuse, said method comprising:
    a) providing OTSG blowdown water having acid insoluble organics therein;
    b) acidifying said OTSG blowdown water to pH 8 or lower;
    c) cooling said OTSG blowdown water to 30-40° C.;
    d) settling precipitants out of said OTSG blowdown water for at least 12 hours to produce an acid clarified blowdown water having more than 50% of the acid insoluble organics removed; and
    e) reusing said acid clarified blowdown water.

2. The method of claim 1, wherein the cooling step c) occurs at least partially before the acidifying step b).

3. The method of claim 1, wherein the settling step d) occurs in a sludge pond.

4. The method of claim 1, wherein the settling step d) occurs in a clarifier tank.

5. The method of claim 1, wherein the reusing step e) comprises use as feedwater in a steam generator.

6. The method of claim 1, wherein the reusing step e) comprises blending with clean feedwater and use as feedwater in a steam generator.

7. The method of claim 1, wherein reusing step e) comprises blending with clean feedwater and use as feedwater in an OTSG.

8. The method of claim 1, further comprising a softening step f) to remove calcium, magnesium and silica.

9. The method of claim 1, further comprising a softening step f) in a warm lime softener to remove calcium, magnesium and silica.

10. The method of claim 5, further comprising a softening step f) in a warm lime softener to remove calcium, magnesium and silica.

11. The method of claim 7, further comprising a softening step f) in a warm lime softener to remove calcium, magnesium and silica.

12. The method of claim 1, further comprising a step d-1) adjusting pH of said acid clarified blowdown water to pH 8 or lower.

13. An improved method of producing steam for oil production, the method comprising heating feedwater in a steam generator to generate steam for downhole use and blowdown water to reuse in said steam generator, the improvement comprising acidifying, cooling to 25-45° C.

and passively clarifying said blowdown water by settling to produce an acid clarified water having about 50% of total organic carbon removed, before reuse of said acid clarified water in said steam generator.

* * * * *